United States Patent
Häberle et al.

(10) Patent No.: US 11,945,901 B2
(45) Date of Patent: Apr. 2, 2024

(54) POLYURETHANE COMPOSITION HAVING LONG PROCESSING TIME AND HIGH STRENGTH

(71) Applicant: SIKA TECHNOLOGY AG, Baar (CH)

(72) Inventors: Hans Häberle, Gailingen (DE); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 702 days.

(21) Appl. No.: 17/252,098

(22) PCT Filed: Jul. 24, 2019

(86) PCT No.: PCT/EP2019/069945
§ 371 (c)(1),
(2) Date: Dec. 14, 2020

(87) PCT Pub. No.: WO2020/025422
PCT Pub. Date: Feb. 6, 2020

(65) Prior Publication Data
US 2021/0253776 A1    Aug. 19, 2021

(30) Foreign Application Priority Data

Jul. 30, 2018 (EP) ..................................... 18186345

(51) Int. Cl.
| | | |
|---|---|---|
| *C08G 18/36* | (2006.01) | |
| *C08G 18/32* | (2006.01) | |
| *C08G 18/48* | (2006.01) | |
| *C08G 18/66* | (2006.01) | |
| *C08G 18/67* | (2006.01) | |
| *C08G 18/76* | (2006.01) | |
| *C09D 175/08* | (2006.01) | |

(52) U.S. Cl.
CPC ..... *C08G 18/4829* (2013.01); *C08G 18/3256* (2013.01); *C08G 18/36* (2013.01); *C08G 18/6696* (2013.01); *C08G 18/676* (2013.01); *C08G 18/7671* (2013.01); *C09D 175/08* (2013.01)

(58) Field of Classification Search
CPC .. C08G 18/36; C08G 18/6696; C08G 18/676; C08G 18/4829; C08G 18/3256
See application file for complete search history.

(56) References Cited

U.S. PATENT DOCUMENTS

| 3,755,222 A | * | 8/1973 | Gruber | ................ C01B 33/2807 524/871 |
|---|---|---|---|---|
| 4,348,511 A | | 9/1982 | Haug | |
| 5,066,824 A | * | 11/1991 | Mafoti | ............... C08G 65/3255 564/468 |
| 5,151,470 A | * | 9/1992 | Sanders | ................... C08L 63/00 525/531 |
| 5,302,303 A | * | 4/1994 | Clatty | .................... C08G 18/28 252/182.25 |

FOREIGN PATENT DOCUMENTS

| EP | 0 039 663 A2 | 11/1981 |
|---|---|---|
| WO | 2009/140344 A1 | 11/2009 |

OTHER PUBLICATIONS

Sep. 23, 2019 International Search Report issued in International Patent Application No. PCT/EP2019/069945.
Feb. 2, 2021 International Preliminary Report on Patentability issued in International Patent Application No. PCT/EP2019/069945.

* cited by examiner

*Primary Examiner* — Michael L Leonard
(74) *Attorney, Agent, or Firm* — Oliff PLC

(57) ABSTRACT

A composition including a first component containing at least one polyol and at least one compound having at least one reactive group of the formula (I), and a second component containing at least one aromatic polyisocyanate and/or at least one polymer containing aromatic isocyanate groups. The composition has a long open time and, even in the case of small amounts of compound having at least one reactive group of the formula (I), enables elastic coatings having improved mechanical properties without causing problems with odor emissions or migration effects. It is thus particularly suitable as a coating for floors or roof areas.

11 Claims, No Drawings

POLYURETHANE COMPOSITION HAVING LONG PROCESSING TIME AND HIGH STRENGTH

TECHNICAL FIELD

The invention relates to two-component polyurethane compositions and to the use thereof, especially as coating.

STATE OF THE ART

Two-component polyurethane compositions are widespread in the building and construction industry, for example as adhesives, sealants, coatings, paints, casting resins or binders (resin matrix) for composites. They consist of a polyol component and an isocyanate component that are stored separately from one another. For application, the two components are mixed with one another, as a result of which the composition cures to give a polymeric elastic material. The isocyanate component here typically contains aromatic isocyanates such as, in particular, diphenylmethane diisocyanate (MDI) or derivatives thereof. Aliphatic isocyanates, because the costs are much higher, are typically only used where there are particularly high demands on yellowing resistance.

Conventional two-component polyurethane compositions based on aromatic isocyanates have an open time of good suitability for non-machine use, but have a tendency to form bubbles under unfavorable climatic conditions of application, especially higher humidity and temperature, and are limited in relation to the strength achievable after curing. The additional use of polyamines in the polyol component can suppress bubble formation and generally increase strength, but usually at the cost of extensibility and elasticity. Moreover, the selection of possible amines that enable a sufficiently long processing time is very limited. Only sterically hindered and electronically deactivated aromatic polyamines enable processing times that are still suitable to some degree with aromatic isocyanates without machine mixing and application. Such polyamines, however, are often solid at room temperature and toxic and cause discoloration.

Rather than polyamines, it is also possible to use compounds having temporarily blocked amino groups, called latent curing agents, for example oxazolidines, ketimines or aldimines. The activation thereof proceeds via hydrolysis of the blocked amino groups to release the amino groups and the blocking agent. Owing to the delayed release of amino groups, latent curing agents react more slowly with isocyanates than the free polyamines, but are nevertheless usually still too fast for a sufficiently long processing time with aromatic isocyanates. Moreover, the blocking agent released can lead to unwanted odor formation, emission, migration or plasticizing action.

WO 2009/140344 discloses two-component compositions that use aminocrotonates or enaminones as curing agents for polyisocyanates. These curing agents show an undesirably short open time. A combination of such curing agents with polyols is described.

SUMMARY OF THE INVENTION

It is therefore an object of the present invention to provide two-component polyurethane compositions having long open time, which cure rapidly without forming bubbles and have high strength coupled with high elasticity and extensibility.

This object is achieved by the composition as claimed in claim 1. The composition contains, in the first component, at least one polyol and additionally at least one compound having at least one reactive group of the formula (I).

The additional use of the compound of the invention can surprisingly considerably increase strength and toughness, especially modulus of elasticity, tear propagation resistance and hardness, even in the case of a relatively small use amount, without distinctly shortening open time or extensibility of the material. This could not be expected proceeding from the prior art, in which such compounds are used as sole curing agents without additional use of polyols. What is also advantageous about the composition of the invention is the fact that the curing thereof does not release any outgassing or plasticizing compounds, which means that there are no problems with odor emissions or migration effects.

Compared to latent curing agents, for example aldimines or ketimines formed from isobutyraldehyde, methyl isobutyl ketone or cyclohexanone, the inventive combination of polyol and compound having at least one reactive group of the formula (I) enables a distinctly longer open time and no odor emissions in the course of curing.

Compared to odorless latent curing agents, for example aldimines of 2,2-dimethyl-3-lauroyloxypropanal, the inventive combination of polyol and compound having at least one reactive group of the formula (I) enables distinctly higher strengths. Compared to sterically hindered and electronically deactivated aromatic polyamines, for example 3,5-dimethylthio-2,4(6)-tolylenediamine, the inventive combination of polyol and the compound having at least one reactive group of the formula (I) enables distinctly longer open times.

The composition of the invention is particularly suitable as a manually processible coating for floors, where a long processing time (open time) and a high hardness, toughness and stability coupled with high elasticity and minimal emissions are required. Such coatings are particularly durable to mechanical stress. Also particularly suitable is the composition of the invention as a manually processible coating for the sealing of flat or slightly inclined roofs (liquid-applied membrane), where a sufficiently long processing time and high extensibility combined with high tear propagation resistance and moderate hardness are required. Such coatings are particularly advantageous with regard to crack bridging.

Further aspects of the invention are the subject of further independent claims. Particularly preferred embodiments of the invention are the subject of the dependent claims.

Ways of Executing the Invention

The invention provides a composition comprising a first component containing
at least one polyol and
at least one compound having at least one reactive group of the formula (I)

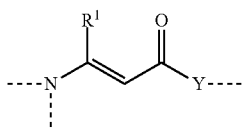

(I)

where R¹ is an alkyl radical having 1 to 8 carbon atoms or a phenyl radical and Y is O, N or C and the compound has an average molecular weight $M_n$ of not more than 2'500 g/mol,
and a second component containing at least one aromatic polyisocyanate and/or at least one polymer containing aromatic isocyanate groups.

A dotted line in the formulae in each case represents the bond to the further residue of the molecule.

Substance names beginning with "poly", such as polyamine, polyol or polyisocyanate, refer to substances containing, in a formal sense, two or more of the functional groups that occur in their name per molecule.

An "aromatic" isocyanate group refers to one bonded directly to an aromatic carbon atom. Isocyanates having exclusively aromatic isocyanate groups are correspondingly referred to as "aromatic isocyanates".

An "aliphatic" isocyanate group refers to one bonded directly to an aliphatic or cycloaliphatic carbon atom. Isocyanates having exclusively aliphatic isocyanate groups are correspondingly referred to as "aliphatic isocyanates".

An "aliphatic" amino group refers to one bonded directly to an aliphatic or cycloaliphatic or arylaliphatic carbon atom. Amines having exclusively aliphatic amino groups are correspondingly referred to as "aliphatic amines".

A "primary" amino group refers to one that is bonded to a single organic radical and bears two hydrogen atoms on the nitrogen atom; a "secondary" amino group refers to one that is bonded to two organic radicals that may also together be part of a ring and bears one hydrogen atom on the nitrogen atom; and a "tertiary" amino group refers to one that is bonded to three organic radicals, two or three of which may also be part of one or more rings, and does not bear any hydrogen atom on the nitrogen atom.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

A composition is referred to as "storage-stable" or "storable" when it can be stored at room temperature in a suitable container over a prolonged period, typically over at least 3 months up to 12 months or more, without this storage resulting in any change in its application or use properties to an extent relevant to its use.

The "open time" or "processing time" refers to the period of time in which the composition can be worked or reworked after the curing process has commenced.

"Room temperature" refers to a temperature of 23° C.

The first and second components of the composition are intrinsically storage-stable and are stored in separate containers until they are mixed with one another shortly before or during application.

The reactive group of the formula (I) is in a formal equilibrium with its tautomeric forms. More particularly, a reactive group of the formula (Ia) is formally in equilibrium with the tautomeric forms of the formulae (Ia') and (Ia").

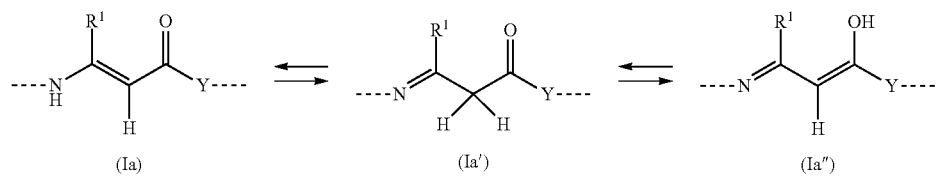

(Ia)  (Ia')  (Ia")

All possible tautomeric forms of the reactive group of the formula (I) are considered to be equivalent in the context of the present invention.

Preferably, the compound having at least one reactive group of the formula (I) has an average molecular weight $M_n$ of less than 1'000 g/mol. Such a compound enables compositions having particularly high strength.

Preferably, $R^1$ is an alkyl radical having 1 to 4 carbon atoms, especially methyl. These reactive groups are based on inexpensive substances of particularly good industrial availability.

In a preferred embodiment of the invention, the compound having at least one reactive group of the formula (I) is a compound of the formula (II)

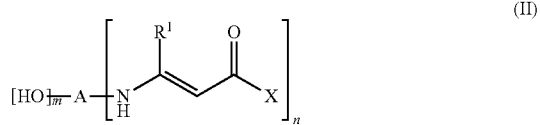

(II)

where
  m is 0 or 1 and n is 1 or 2 or 3 and the sum total of (m+n) is 2 or 3,
  A is an (m+n)-valent aliphatic, cycloaliphatic or arylaliphatic organic radical having 2 to 100 carbon atoms, and
  X is an alkyl or alkoxy radical having 1 to 8 carbon atoms, or a radical of the formula —$NR^2R^3$ where $R^2$ and $R^3$ are each independently H or an alkyl, cycloalkyl, aralkyl or aryl radical optionally having ether oxygen and having 1 to 12 carbon atoms, or together are an alkylene radical optionally having ether oxygen and having 3 to 6 carbon atoms, and $R^1$ has the definitions already given.

Y- - - here represents X.

Preferably, (m+n) is 2.

In particular, A is a divalent aliphatic or cycloaliphatic or arylaliphatic radical optionally having ether oxygen.

A preferably has 6 to 50, especially 6 to 25, carbon atoms.

More preferably, A is a radical selected from the group consisting of 1,2-ethylene, 1,3-propylene, 2-methyl-1,5-pentylene, 1,6-hexylene, 1,3-cyclohexylenebis(methylene), 1,3-phenylenebis(methylene), (1,5,5-trimethylcyclohexan-1-yl)methane-1,3,3-oxa-1,5-pentylene and α,ω-polyoxypropylene having an average molecular weight $M_n$ in the range from 170 to 500 g/mol. These compounds of the formula (II) are readily obtainable, easily processible and enable compositions having good processability.

Most preferably, A is α,ω-polyoxypropylene having an average molecular weight $M_n$ in the range from 170 to 500 g/mol. Such a compound of the formula (II) has readily manageable viscosity and enables compositions having easy processability and particularly high extensibility.

Preferably, X is an alkyl or alkoxy radical having 1 to 4 carbon atoms, especially methyl, methoxy or ethoxy, or is —$NR^2R^3$ where $R^2$ and $R^3$ are each an alkyl radical 1 to 4 carbon atoms, especially diethylamino.

More preferably, X is a radical selected from methyl, ethoxy and diethylamino. These compounds of the formula (II) are preparable proceeding from inexpensive substances of particularly good availability. Among these, preference is given to methyl or ethoxy.

Most preferably, X is ethoxy. Such a compound of the formula (II) is particularly easily obtainable and of particularly low viscosity and enables particularly long open times.

The preferred compounds of the formula (II) are obtainable from readily available starting materials in a simple process and enable compositions having particularly good mechanical properties.

In a particularly preferred compound of the formula (II), m is 0, n is 2 or 3 and A is a di- or trivalent organic radical having at least 2 ether groups. Such a compound of the formula (II) enables a particularly long open time and particularly high extensibility.

Such a compound of the formula (II) is especially a compound of the formula (II a)

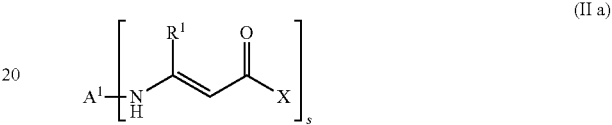

(II a)

where s is 2 or 3, $A^1$ is a di- or trivalent organic radical having 6 to 100 carbon atoms and at least 2 ether groups, and $R^1$ and X have the definitions already given.

$A^1$ preferably has 6 to 50, especially 6 to 25, carbon atoms.

Preferably, s is 2 and $A^1$ is α,ω-polyoxypropylene having an average molecular weight $M_n$ in the range from 170 to 500 g/mol, or s is 3 and $A^1$ is a trivalent polyoxypropylene radical started from trimethylolpropane or glycerol and having an average molecular weight $M_n$ in the range from 300 to 500 g/mol.

In a particularly preferred compound of the formula (II a), s is 2, $A^1$ is α,ω-polyoxypropylene having an average molecular weight $M_n$ in the range from 170 to 500 g/mol, and $R^1$ is methyl. Preferably, X is a radical selected from methyl, ethoxy and diethylamino, especially ethoxy. Such a compound is of particularly low viscosity and hence particularly easy to handle and enables compositions having particularly high extensibility.

Most preferred is a compound of the formula (II a) in which s is 2, $A^1$ is α,ω-polyoxypropylene having an average molecular weight $M_n$ in the range from 170 to 500 g/mol, $R^1$ is methyl and X is ethoxy. Such a compound is an N,N'-bis(ethylcrotonat-3-yl)polyoxypropylenediamine. It is of very particularly low viscosity and enables compositions having particularly high strength and extensibility.

In a further particularly preferred compound of the formula (II), m and n are each 1. Such a compound of the formula (II) is of very particularly low viscosity and hence enables a particularly good processability, and also a particularly long open time and particularly high strength, extensibility and toughness.

Such a compound of the formula (II) is especially a compound of the formula (II b)

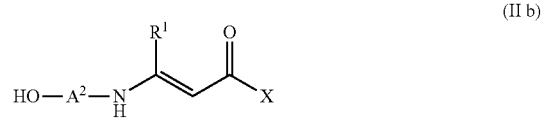

(II b)

where $A^2$ is a divalent aliphatic, cycloaliphatic or arylaliphatic organic radical having 2 to 50 carbon atoms, and $R^1$ and X have the definitions already given.

$A^2$ preferably has 2 to 25, especially 2 to 12, carbon atoms.

More preferably, $A^2$ is 1,2-ethylene, 1,2-propylene, 1,3-propylene, 1,4-butylene, 2,4-butylene, 1,5-pentylene, 1,6-hexylene, 1,7-heptylene, 1,8-octylene, 1,10-decylene, 1,12-dodecylene, 3-oxa-1,5-pentylene, 3,6-dioxa-1,8-octylene, 1,4-phenylenebis(ethylene) or (1,5,5-trimethylcyclohexan-1-yl)methane-1,3, especially 1,2-ethylene or 3-oxa-1,5-pentylene.

In a particularly preferred compound of the formula (II b), $A^2$ is 1,2-ethylene or 3-oxa-1,5-pentylene, $R^1$ is methyl and X is a radical selected from methyl, ethoxy and diethylamino, especially ethoxy. Such a compound is liquid at room temperature and of particularly low viscosity and hence particularly easy to handle and enables compositions having particularly high strength coupled with long open time.

In a further embodiment of the invention, the compound having at least one reactive group of the formula (I) is a compound of the formula (III)

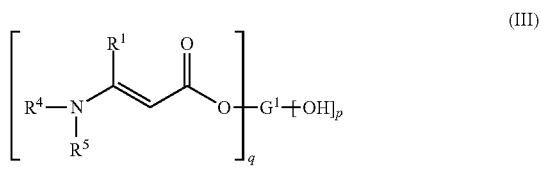

where
p is 0, 1 or 2 and q is 1, 2 or 3 and the sum total of (p+q) is 2 or 3,
$G^1$ is a (p+q)-valent aliphatic, cycloaliphatic or arylaliphatic organic radical having 2 to 100 carbon atoms,
$R^4$ is an alkyl, cycloalkyl, aralkyl or aryl radical optionally having ether oxygen and having 1 to 12 carbon atoms,
$R^5$ is H or an alkyl, cycloalkyl, aralkyl or aryl radical optionally having ether oxygen and having 1 to 12 carbon atoms,
or $R^4$ and $R^5$ together are an alkylene radical optionally having ether oxygen and having 3 to 6 carbon atoms,
and $R^1$ has the definitions already given.
Y here is O.

Preferably, (p+q) is 2. Such a compound of formula (III) is of particularly low viscosity.

(p+q) is also preferably 3. Such a compound enables particularly high strengths.

Preferably, $G^1$ has 6 to 50, especially 6 to 25, carbon atoms.

More preferably, (p+q) is 2 and $G^1$ is an am-polyoxyalkylene radical, especially a polyoxypropylene radical having an average molecular weight $M_n$ in the range from 200 to 500 g/mol.

Preferably, $R^5$ is H and $R^4$ is an alkyl, cycloalkyl or alkyl radical having 4 to 12 carbon atoms, especially butyl, isobutyl, sec-butyl, tert-butyl, isopentyl, 3-methylbutyl, hexyl, cyclohexyl, octyl, 2-ethylhexyl, lauryl or benzyl.

Further preferably, $R^4$ and $R^5$ together are 1,3-propylene or 1,4-butylene and, together with the nitrogen atom, form a pyrrolidine ring or a piperidine ring. Most preferably, $R^5$ is H.

Such compounds of the formula (III) are particularly easy to prepare, especially compared to similar compounds that have two hydrogen atoms on the nitrogen and do not conform to the formula (III).

In a particularly preferred embodiment of the compound of the formula (III), p is 0, q is 2, $G^1$ is am-polyoxypropylene having an average molecular weight $M_n$ in the range from 200 to 500 g/mol, and $R^1$ is methyl.

Preferably, $R^5$ here is H and $R^4$ is a radical selected from butyl, isobutyl, sec-butyl, tert-butyl, isopentyl, 3-methylbutyl, hexyl, cyclohexyl, octyl, 2-ethylhexyl, lauryl, benzyl, hydroxyethyl and 2-(2-hydroxyethoxy)ethyl. Such a compound of the formula (III) is easily obtainable, is liquid at room temperature and enables compositions having particularly high extensibility.

In a very particularly preferred compound of the formula (III), $R^5$ is H and $R^4$ is an alkyl, cycloalkyl, aralkyl or aryl radical which has a hydroxyl group and optionally has ether oxygen and has 1 to 12 carbon atoms. Such a compound of the formula (III) has particularly high functionality. It is liquid at room temperature and, even in the case of a small use amount, enables high strength and particularly high crosslinking density.

Such a compound of the formula (III) is especially a compound of the formula (III a)

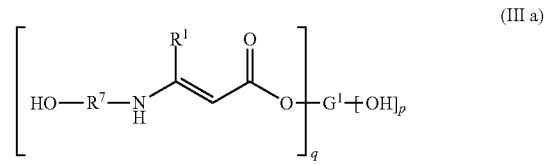

where $R^7$ is a divalent aliphatic, cycloaliphatic or arylaliphatic organic radical having 2 to 12 carbon atoms, and p, q, $R^1$ and $G^1$ have the definitions already given. Preferably, p is 0 and q is 2.

Preferably, $R^7$ is 1,2-ethylene or 3-oxa-1,5-pentylene, especially 1,2-ethylene.

In a further embodiment of the invention, the compound having at least one reactive group of the formula (I) is a compound of the formula (IV)

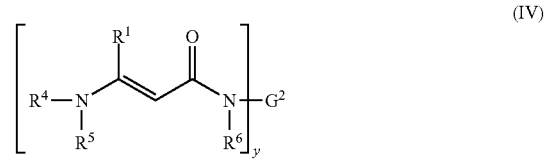

where
y is 2 or 3,
$G^2$ is a y-valent aliphatic, cycloaliphatic or arylaliphatic organic radical having 2 to 100 carbon atoms,
$R^6$ is H or an alkyl radical having 1 to 6 carbon atoms, and $R^1$, $R^4$ and $R^5$ have the definitions already given.
Y here is N.
Preferably, y is 2.
Preferably, $G^2$ has 6 to 50, especially 6 to 25, carbon atoms.
In particular, y is 2 and $G^2$ is $\alpha,\omega$-polyoxypropylene having an average molecular weight $M_n$ in the range from 170 to 500 g/mol.
Preferably $R^6$ is H or is 2-propyl, especially H.

Compounds of the formula (II) are preferred over compounds of the formula (III). They enable cured compositions having particularly high stability to hydrolysis. Compounds of the formula (II) and (III) are preferred over compounds of the formula (IV) owing to their particularly low viscosity.

More preferably, the compound having at least one reactive group of the formula (I) is selected from the group consisting of compounds of the formula (II a), compounds of the formula (II b) and compounds of the formula (III), preferred compounds of the formula (III) being those of the formula (III a).

A compound of the formula (II) is especially obtained by reaction of at least one amine of the formula (V) with at least one 1,3-dicarbonyl compound of the formula (VI)

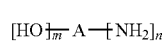  (V)

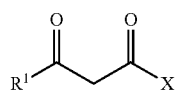  (VI)

where m, n, A, $R^1$ and X have the definitions already given.

At least one amine of the formula (V a) is used for the preparation of a compound of the formula (II a), and at least one amine of the formula (V b) for the preparation of a compound of the formula (II b),

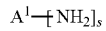  (V a)

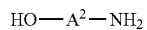  (V b)

where $A^1$, s and $A^2$ have the definitions already given.

The 1,3-dicarbonyl compound of the formula (VI) is preferably used here in a stoichiometric amount or in a stoichiometric excess in relation to the primary amino groups of the amine of the formula (V). The reaction is preferably effected at temperatures below 90° C., especially at 10 to 80° C.

The reaction may be conducted in an acid-catalyzed or else catalyst-free manner. The water formed in the reaction is preferably removed, especially by applying reduced pressure.

Suitable amines of the formula (V) are aliphatic amines, especially amino alcohols such as, in particular, 2-aminoethanol, 2-amino-1-propanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol, or derivatives, bearing a primary amino group, of glycols such as diethylene glycol, dipropylene glycol, dibutylene glycol or higher oligomers or polymers of these glycols, especially 2-(2-aminoethoxy)ethanol or 2-(2-(2-aminoethoxy)ethoxy)ethanol, primary aliphatic diamines such as, in particular, ethane-1,2-diamine, propane-1,2-diamine, propane-1,3-diamine, butane-1,4-diamine, butane-1,3-diamine, 2-methylpropane-1,2-diamine, pentane-1,3-diamine, pentane-1,5-diamine, 2,2-dimethylpropane-1,3-diamine, hexane-1,6-diamine, 1,5-diamino-2-methylpentane, heptane-1,7-diamine, octane-1,8-diamine, 2,5-dimethylhexane-1,6-diamine, nonane-1,9-diamine, 2,2(4),4-trimethylhexane-1,6-diamine, decane-1,10-diamine, undecane-1,11-diamine, 2-butyl-2-ethylpentane-1,5-diamine, dodecane-1,12-diamine, cyclohexane-1,2-diamine, cyclohexane-1,3-diamine, cyclohexane-1,4-diamine, 1-amino-3-aminomethyl-3,5,5-trimethylcyclohexane, 4(2)-methylcyclohexane-1,3-diamine, 1,3-bis(aminomethyl)cyclohexane, 1,4-bis(aminomethyl)cyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 2,5(2,6)-bis(aminomethyl)bicyclo[2.2.1]heptane, 3(4),8(9)-bis(aminomethyl)tricyclo[5.2.1.0$^{2,6}$]decane, 1,3-bis(aminomethyl)benzene, 1,4-bis(aminomethyl)benzene, 3-oxapentane-1,5-diamine, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, am-polyoxypropylenediamine having an average molecular weight $M_n$ in the range from 200 to 2'000 g/mol, especially the Jeffamine® products D-230, D-400 or XTJ-582, (all from Huntsman), α,ω-polyoxypropylene/polyoxyethylenediamine, especially the Jeffamine® products ED-600 or ED-900 (both from Huntsman), α,ω-polyoxypropylene/polyoxybutylene-1,4-diamine, especially Jeffamine® THF-100 (from Huntsman) or α,ω-polyoxypropylen/polyoxybutylene-1,2-diamine, especially Jeffamine® XTJ-568 (from Huntsman), or primary aliphatic triamines such as, in particular, 1,3,6-triaminohexane, 1,4,8-triaminooctane, 4-aminomethyloctane-1,8-diamine, 5-aminomethyloctane-1,8-diamine, 1,6,11-triaminoundecane, 1,3,5-triaminocyclohexane, 1,3,5-tris(aminomethyl)cyclohexane, 1,3,5-tris(aminomethyl)benzene, trimethylolpropane- or glycerol-started tris(ω-polyoxypropyleneamine) having an average molecular weight $M_n$ in the range from 380 to 2'000 g/mol, especially Jeffamine® T-403 (from Huntsman), or trimethylolpropane-started tris(ω-polyoxypropylene/polyoxy-1,2-butyleneamine), especially Jeffamine® XTJ-566 (from Huntsman).

Among these, preference is given to amino alcohols, i.e. amines of the formula (V b), and polyether diamines and polyether triamines, i.e. amines of the formula (V a).

More preferably, the amine is selected from the group consisting of 2-aminoethanol, 3-amino-1-propanol, 3-aminomethyl-3,5,5-trimethylcyclohexanol, 2-(2-aminoethoxy)ethanol, α,ω-polyoxypropylenediamines having an average molecular weight $M_n$ in the range from 200 to 530 g/mol, especially Jeffamine® D-230, D-400 or XTJ-582, and trimethylolpropane- or glycerol-started polyoxypropylenetriamines having an average molecular weight $M_n$ in the range from 300 to 550 g/mol, especially Jeffamine® T-403.

Among these, preference is given to 2-aminoethanol, 2-(2-aminoethoxy)ethanol or α,ω-polyoxypropylenediamines having an average molecular weight $M_n$ in the range from 200 to 530 g/mol. These amines enable particularly preferred compounds of the formula (II a) or (II b).

Suitable 1,3-dicarbonyl compounds of the formula (VI) are especially 1,3-diketones such as, in particular, acetylacetone, or 1,3-keto esters such as, in particular, ethyl acetoacetate, or 1,3-keto amides such as, in particular, N,N-diethyl-3-oxobutanamide. Particular preference is given to ethyl acetoacetate. These dicarbonyl compounds are particularly readily available and enable compounds of the formula (II) having good properties.

A compound of the formula (III) is especially obtained by transesterifying at least one polyol of the formula (VII) with at least one β-keto ester of the formula (VIII), followed by reaction with at least one amine of the formula (IX),

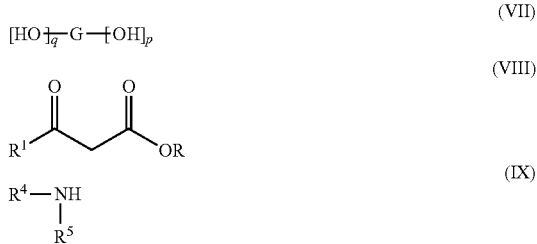

where p, q, G, $R^1$, $R^4$ and $R^5$ have the definitions already given.

For the preparation of a compound of the formula (III a), at least one amine of the formula (IX a) is used:

HO—$R^7$—NH$_2$ (IX a)

where $R^7$ has the definitions already given.

For the transesterification, about q mol of β-keto ester of the formula (VIII) is used per mole of polyol of the formula (VII), and the alcohol HOR released is preferably removed by means of distillation under reduced pressure. This gives rise to a compound of the formula

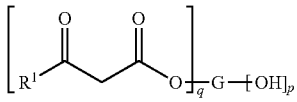

as intermediate, which is then reacted with the amine of the formula (IX), optionally in the presence of an acid as catalyst. The water formed in the reaction is preferably removed, especially by applying reduced pressure.

Suitable polyols of the formula (VII) are especially commercial compounds having two or three OH groups, especially oligomeric or polymeric diols or triols. Preference is given to polyether diols or triols, especially dipropylene glycol, tripropylene glycol, diethylene glycol, triethylene glycol, trimethylolpropane or glycerol, and alkoxylates thereof, and higher polymeric polyoxyethylenedi- or triols, polyoxypropylenedi- or triols, or mixed polyoxyethylene-polyoxypropylenedi- or triols.

Particular preference is given to polyoxypropylenediols having an average molecular weight $M_n$ in the range from 200 to 2'000 g/mol, preferably 200 to 530 g/mol.

A particularly suitable β-keto ester of the formula (VIII) is tert-butyl acetoacetate. The transesterification with the polyol is thus effected in a particularly simple manner, and the alcohol released and its conversion products can be easily removed.

Suitable amines of the formula (IX) are commercial primary or secondary monoamines or amino alcohols (amines of the formula (IX a)), especially aliphatic, cycloaliphatic or arylaliphatic types, especially butylamine, isobutylamine, sec-butylamine, tert-butylamine, isopentylamine, 3-methylbutylamine, hexylamine, cyclohexylamine, octylamine, 2-ethylhexylamine, laurylamine, benzylamine, 2-aminoethanol, 2-(2-aminoethoxy)ethanol or pyrrolidine.

A compound of the formula (IV) is especially obtained by reacting at least one amine of the formula (X) with at least one β-keto ester of the formula (VIII), followed by reaction with at least one amine of the formula (IX),

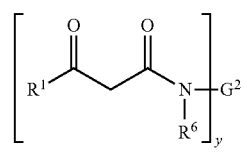

where y, $G^2$ and $R^6$ have the definitions already given.

For the reaction, first of all, about y mol of β-keto ester of the formula (VIII) per mole of amine of the formula (X) is converted at temperatures of at least 100° C., preferably about 110 to 130° C., and the alcohol HOR released is preferably removed by means of distillation under reduced pressure. This gives rise to a compound of the formula

as intermediate, which is then reacted with the amine of the formula (IX), optionally in the presence of an acid as catalyst. The water formed here is preferably removed, especially by applying reduced pressure.

Suitable amines of the formula (X) are especially α,ω-polyoxypropylenediamines having primary amino groups and an average molecular weight $M_n$ in the range from 200 to 530 g/mol, especially Jeffamine® D-230, D-400 or XTJ-582, or analogous types having secondary amino groups, especially Jeffamine® SD-231 or SD-401 (all from Huntsman).

Suitable and preferred β-keto esters of the formula (VIII) and amines of the formula (IX) are those already mentioned.

The reactive group of the formula (I) is a vinylogous urethane group or a vinylogous urea group or vinylogous amide group, depending on whether Y is O, N or C. It is hydrolysis-resistant and has the ability to react with isocyanate groups without releasing cleavage products. This distinguishes them from latent curing agents such as oxazolidines, aldimines or ketimines, the blocked amino groups of which are hydrolyzed and react with isocyanate groups via the elimination of a blocking agent.

The reaction proceeds via the addition of the nucleophilic enamine carbon of the reactive group of the formula (I) onto the isocyanate group, forming a moiety of the formula.

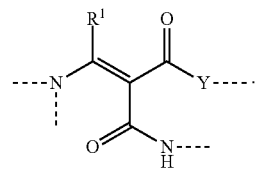

The first component contains at least one polyol.

Especially suitable polyols are those that are liquid at room temperature.

Preference is given to polyols having an average molecular weight $M_n$ in the range from 400 to 20'000 g/mol, preferably 500 to 10'000 g/mol, especially 500 to 5'000 g/mol.

Preference is given to polyols having an average OH functionality in the range from 1.6 to 4, more preferably from 1.8 to 3.

Particular preference is given to polyols having an average molecular weight $M_n$ in the range from 500 to 10'000 g/mol and an average OH functionality in the range from 1.8 to 3.

Suitable polyols as a constituent of the first component are especially the following commercially available polyols or mixtures thereof:

polyether polyols, especially polyoxyalkylenediols and/or polyoxyalkylenetriols, especially polymerization products of ethylene oxide, 1,2-propylene oxide, 1,2- or 2,3-butylene oxide, oxetane, tetrahydrofuran or mixtures thereof, where these are polymerized with the aid of a starter molecule having two or more active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol, aniline, ethylenediamine or mixtures of the aforementioned compounds. Likewise suitable are polyether polyols with polymer particles dispersed therein, especially those with styrene/acrylonitrile (SAN) particles or polyurea or polyhydrazodicarbonamide (PHD) particles.

Preferred polyether polyols are polyoxypropylenediols, polyoxypropylenetriols or ethylene oxide-terminated (EO-endcapped) polyoxypropylenediols or -triols. The latter are mixed polyoxyethylene/polyoxypropylene polyols (block copolymers) which are especially obtained by further alkoxylating polyoxypropylene diols or triols with ethylene oxide on conclusion of the polypropoxylation reaction, and ultimately mainly have primary hydroxyl groups as a result.

Preferred polyether polyols have a degree of unsaturation of less than 0.02 meq/g, especially less than 0.01 meq/g.

Polyester polyols, also called oligoesterols, prepared by known processes, especially the polycondensation of hydroxycarboxylic acids or lactones or the polycondensation of aliphatic and/or aromatic polycarboxylic acids with di- or polyhydric alcohols. Preference is given to polyester diols from the reaction of dihydric alcohols such as, in particular, ethane-1,2-diol, diethylene glycol, propane-1,2-diol, dipropylene glycol, butane-1,4-diol, pentane-1,5-diol, 3-methylpentane-1, 5-diol, hexane-1,6-diol, neopentyl glycol, or trihydric alcohols such as glycerol, 1,1,1-trimethylolpropane or mixtures of the aforementioned alcohols, with organic dicarboxylic acids or the anhydrides or esters thereof, such as, in particular, succinic acid, glutaric acid, adipic acid, suberic acid, sebacic acid, dodecanedicarboxylic acid, maleic acid, fumaric acid, phthalic acid, isophthalic acid, terephthalic acid or hexahydrophthalic acid or mixtures of the aforementioned acids, or polyester polyols formed from lactones such as, in particular, ε-caprolactone. Particular preference is given to polyester polyols formed from adipic acid or sebacic acid or dodecanedicarboxylic acid and hexanediol or neopentyl glycol.

Particularly suitable polyester polyols are polyester diols.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Polyacrylate polyols and polymethacrylate polyols.

Polyhydroxy-functional fats and oils, also called fatty acid polyols, especially natural fats and oils optionally modified with ketone resins, especially castor oil or reaction products of castor oil with ketone resins; or polyols obtained by chemical modification of natural fats and oils—called oleochemical polyols—for example the polyols obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes, such as alcoholysis or ozonolysis, and subsequent chemical linkage, for example by transesterification or dimerization, of the degradation products or derivatives thereof thus obtained. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.

Polyhydrocarbon polyols, also called oligohydrocarbonols, such as, for example, polyhydroxy-functional polyolefins, polyisobutylenes, polyisoprenes; polyhydroxy-functional ethylene/propylene, ethylene/butylene or ethylene/propylene/diene copolymers, as produced, for example, by Kraton Polymers; polyhydroxy-functional polymers of dienes, especially of 1,3-butadiene, which can especially also be prepared from anionic polymerization; polyhydroxy-functional copolymers of dienes, such as 1,3-butadiene, or diene mixtures and vinyl monomers, such as styrene, acrylonitrile, vinyl chloride, vinyl acetate, vinyl alcohol, isobutylene and isoprene, for example polyhydroxy-functional acrylonitrile/butadiene copolymers, as can be prepared, for example, from epoxides or aminoalcohols and carboxyl-terminated acrylonitrile/butadiene copolymers (commercially available, for example, under the Hypro® CTBN or CTBNX or ETBN name from Emerald Performance Materials); and hydrogenated polyhydroxy-functional polymers or copolymers of dienes.

Preferred polyols are polyether polyols, polyether polyols having polymer particles dispersed therein or grafted thereon, especially those having styrene-acrylonitrile particles (SAN), polyester polyols, polycarbonate polyols, poly(meth)acrylate polyols, polybutadiene polyols or fatty acid polyols, especially polyether polyols or fatty acid polyols.

Particularly preferred polyols are polyether polyols, especially polyoxyalkylene polyols, especially polyoxypropylene polyols or polyoxyethylene-polyoxypropylene copolyols, optionally containing styrene-acrylonitrile particles dispersed therein or grafted thereon. Polyether polyols enable particularly high flexibility, as desired, for example, for roof seals, wherein styrene-acrylonitrile particles dispersed therein or grafted thereon can enable higher strength.

Also particularly preferred are fatty acid polyols, especially castor oil or derivatives of castor oil. Fatty acid polyols enable particularly high strength and toughness, as desired for floor coatings. Especially preferred are reaction products of castor oil with ketone resins. Such polyols are commercially available, especially as Setathane® D 1150 (from Nuplex) or Sovermol® 805 (from BASF).

In a preferred embodiment of the invention, the composition contains at least one fatty acid-based polyol having an average molecular weight $M_n$ in the range from 500 to 2'000 g/mol, especially in the form of a reaction product with a ketone resin and especially based on castor oil or a derivative of castor oil. Such a polyol enables compositions of particularly high strength coupled with high extensibility, which are particularly suitable for coatings subject to particular mechanical stress, for example floor coatings.

In a further preferred embodiment of the invention, the composition comprises at least one polyether triol having an average molecular weight $M_n$ in the range from 3'000 to 6'000 g/mol, especially with styrene-acrylonitrile particles dispersed therein or grafted thereon. Such a polyol enables compositions having particularly good crack-bridging properties and particularly high extensibility, which are particularly suitable for the coating and/or sealing of roof areas.

The polyol is more preferably selected from the group consisting of fatty acid-based polyols having an average molecular weight $M_n$ in the range from 500 to 2'000 g/mol and polyether triols having an average molecular weight $M_n$ in the range from 3'000 to 6'000 g/mol, especially with styrene-acrylonitrile particles dispersed therein or grafted thereon.

Preferred polyols are especially also mixtures of two or more polyols.

The composition comprises, in the second component, at least one aromatic polyisocyanate and/or at least one aromatic polymer containing isocyanate groups.

Preferred aromatic polyisocyanates are diisocyanates, especially diphenylmethane 4,4'- or 2,4'- or 2,2'-diisocyanate or mixtures thereof (MDI), tolylene 2,4-diisocyanate, optionally with fractions of tolylene 2,6-diisocyanate (TDI), phenylene 1,3-diisocyanate or phenylene 1,4-diisocyanate or mixtures thereof.

Preferred aromatic polyisocyanates are also higher-functionality polyisocyanates, especially MDI homologs and mixtures thereof with MDI (polymeric MDI or PMDI), or room temperature liquid derivatives of MDI (called "modified MDI"), which are mixtures of MDI with MDI derivatives, such as, in particular, MDI carbodiimides or MDI uretonimines or MDI urethanes. These especially have an average NCO functionality in the range from 2.1 to 4.0.

A particularly preferred aromatic polyisocyanate is TDI, MDI, PMDI or a room temperature liquid derivative of MDI, especially a mixture of MDI with MDI carbodiimides.

More preferably, the composition comprises diphenylmethane 4,4'-diisocyanate as aromatic polyisocyanate, optionally including fractions of diphenylmethane 2,4'- or 2,2'-diisocyanate and/or derivatives of diphenylmethane 4,4'-diisocyanate or homologs of diphenylmethane 4,4'-diisocyanate.

A suitable polymer containing aromatic isocyanate groups is especially obtained from the reaction of at least one polyol with a superstoichiometric amount of at least one aromatic polyisocyanate, in particular diisocyanate, preferably MDI or TDI. The reaction is preferably carried out with exclusion of moisture at a temperature in the range from 50 to 160° C., optionally in the presence of suitable catalysts. The polymer is optionally prepared with additional use of plasticizers or solvents, in which case the plasticizers or solvents used do not contain any groups reactive toward isocyanates.

The excess of polyisocyanate is preferably chosen so as to leave in the polymer, after the reaction of all hydroxyl groups, a content of free isocyanate groups in the range from 1% to 30% by weight, preferably 1.5% to 25% by weight, more preferably 2% to 20% by weight, based on the overall polymer.

Such a polymer containing isocyanate groups preferably has an average molecular weight $M_n$ in the range from 350 to 6'000 g/mol.

Suitable polyols for the preparation of a polymer containing isocyanate groups are polyols already mentioned as part of the first component.

Preference is given to polyether polyols, polyester polyols, polycarbonate polyols, poly(meth)acrylate polyols or polybutadiene polyols.

Particular preference is given to polyether polyols, especially polyoxyalkylenepolyols.

Most preferred are polyoxypropylenedi- or triols or ethylene oxide-terminated polyoxypropylenedi- or triols.

Preference is given to polyols having an average molecular weight $M_n$ in the range from 400 to 20'000 g/mol, especially 1'000 to 15'000 g/mol.

Preference is given to polyols having an average OH functionality in the range from 1.8 to 3.

Preference is given to polyols that are liquid at room temperature.

In the preparation of a polymer containing isocyanate groups, it is also possible to use fractions of di- or polyfunctional alcohols, especially ethane-1,2-diol, propane-1,2-diol, propane-1,3-diol, 2-methylpropane-1,3-diol, butane-1,2-diol, butane-1,3-diol, butane-1,4-diol, pentane-1,3-diol, pentane-1,5-diol, 3-methylpentane-1,5-diol, neopentyl glycol, dibromoneopentyl glycol, hexane-1,2-diol, hexane-1,6-diol, heptane-1,7-diol, octane-1,2-diol, octane-1,8-diol, 2-ethylhexane-1,3-diol, diethylene glycol, triethylene glycol, dipropylene glycol, tripropylene glycol, cyclohexane-1,3- or -1,4-dimethanol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols, such as especially xylitol, sorbitol or mannitol, or sugars such as, in particular, sucrose, or alkoxylated derivatives of the alcohols mentioned or mixtures of the alcohols mentioned.

Preferred constituents of the second component are especially also combinations of one or more polyisocyanates and one or more polymers containing isocyanate groups.

As a constituent of the first component, the composition may comprise further substances that are reactive with isocyanates, especially di- or polyfunctional alcohols, especially those having an average molecular weight $M_n$ in the range from 250 to 500 g/mol, especially ethoxylated and/or propoxylated bisphenol A, bisphenol F, trimethylolpropane or glycerol, chain extenders, especially diols having a molecular weight $M_n$ in the range from 62 to 150 g/mol, especially ethylene glycol, propane-1,3-diol, butane-1,4-diol or pentane-1,5-diol, small amounts of primary polyamines, especially in order to directly obtain a structurally viscous, firm material that flows away to a lesser degree with the mixing of the two components, amino alcohols, or latent hardeners such as, in particular, ketimines, aldimines or oxazolidines.

The composition preferably comprises, in addition to at least one polyol, at least one further di- or polyfunctional alcohol having an average molecular weight $M_n$ in the range from 250 to 500 g/mol, especially selected from ethoxylated and/or propoxylated trimethylolpropane, ethoxylated and/or propoxylated glycerol, ethoxylated and/or propoxylated bisphenol A and ethoxylated and/or propoxylated bisphenol F. Such an alcohol enables high strengths.

As a constituent of the second component, the composition may additionally also comprise aliphatic polyisocyanates or polymers having aliphatic isocyanate groups, especially hexamethylene 1,6-diisocyanate (HDI), 1-isocyanato-3,3,5-trimethyl-5-isocyanatomethylcyclohexane (isophorone diisocyanate or IPDI), or oligomers, derivatives or polymers derived therefrom, especially an IPDI isocyanurate or a mixed isocyanurate based on TDI/HDI or an HDI oligomer.

The composition may additionally comprise further constituents, especially the following auxiliaries and admixtures:

fillers, especially ground or precipitated calcium carbonates, optionally coated with fatty acids, especially stearates, barytes, quartz flours, quartz sands, dolomites, wollastonites, kaolins, calcined kaolins, sheet silicates, such as mica or talc, zeolites, aluminum hydroxides, magnesium hydroxides, silicas, including finely divided silicas from pyrolysis processes, industrially produced carbon blacks, graphite, metal powders, for example of aluminum, copper, iron, silver or steel, PVC powders or hollow beads;

fibers, especially glass fibers, carbon fibers, metal fibers, ceramic fibers, polymer fibers, such as polyamide fibers or polyethylene fibers, or natural fibers, such as wool, cellulose, hemp or sisal;

nanofillers such as graphene or carbon nanotubes;

dyes;

pigments, especially titanium dioxide, chromium oxide, iron oxides or organic pigments;

plasticizers, especially phthalates, terephthalates, trimellitates, adipates, sebacates, azelates, succinates, citrates, benzoates, diesters of ortho-cyclohexanedicarboxylic acid, acetylated glycerol, monoglycerides, fatty acid methyl or ethyl esters, also called "biodiesel", natural or modified vegetable oils, organic phosphoric or sulfonic esters, sulfonamides, urethanes, high-boiling hydrocarbons, polybutenes, polyisobutylenes, polystyrenes or chloroparaffins;

solvents, especially those as customarily used in paints, varnishes or coatings;

modifiers such as hydrocarbon resins, natural or synthetic waxes or bitumen;

rheology modifiers, especially urea compounds, sheet silicates such as bentonites, derivatives of castor oil, hydrogenated castor oil, polyamides, polyurethanes, fumed silicas or hydrophobically modified polyoxyethylenes;

desiccants, especially molecular sieves, calcium oxide, monooxazolidines such as Incozol® 2 (from Incorez) or orthoformic esters;

adhesion promoters, especially titanates or organoalkoxysilanes such as aminosilanes, mercaptosilanes, epoxysilanes, vinylsilanes, (meth)acrylosilanes, carbamatosilanes, alkylsilanes, S-(alkylcarbonyl)mercaptosilanes, aldiminosilanes or oligomeric forms of these silanes;

catalysts which accelerate the reaction of the isocyanate groups, especially compounds of tin, iron, bismuth, zinc, manganese, chromium, cobalt, copper, nickel, molybdenum, lead, cadmium, mercury, antimony, vanadium, titanium, aluminum, potassium or rare earth metals, especially organotin(IV) compounds such as dibutyltin diacetate, dibutyltin dilaurate, dimethyltin dilaurate, dibutyltin dichloride, dibutyltin diacetylacetonate or dioctyltin dilaurate, bismuth(III) complexes, zinc(II) acetate, zinc(II) 2-ethylhexanoate, zinc(II) laurate, zinc(II) acetylacetonate, cobalt(II) 2-ethyl hexanoate, copper(II) 2-ethylhexanoate, nickel(II) naphthenate, aluminum lactate, aluminum oleate, diisopropoxytitanium bis(ethylacetoacetate); compounds containing tertiary amino groups, especially N-ethyldiisopropylamine, N,N,N',N'-tetramethylalkylenediamines, pentamethylalkylenetriamines and higher homologs thereof, bis-(N,N-diethylaminoethyl)adipate, tris(3-dimethylaminopropyl)amine, 1,4-diazabicyclo[2.2.2]octane (DABCO), 1,8-diazabicyclo[5.4.0]undec-7-ene (DBU), 1,5-diazabicyclo[4.3.0]non-5-ene (DBN), 2,2'-dimorpholinodiethyl ether (DMDEE), N-alkylmorpholines, N,N'-dimethylpiperazine; aromatic nitrogen compounds such as 4-dimethylaminopyridine, N-methylimidazole, N-vinylimidazole or 1,2-dimethylimidazole; organic ammonium compounds such as benzyltrimethylammonium hydroxide or alkoxylated tertiary amines; called "delayed action" catalysts, which are modifications of known metal or amine catalysts; and combinations of the compounds mentioned, especially of metal compounds and tertiary amines;

non-reactive thermoplastic polymers, for example homo- or copolymers of unsaturated monomers, especially from the group comprising ethylene, propylene, butylene, isobutylene, isoprene, vinyl acetate and alkyl (meth)acrylates, especially polyethylenes (PE), polypropylenes (PP), polyisobutylenes, ethylene-vinyl acetate copolymers (EVA) and atactic poly-α-olefins (APAO);

flame-retardant substances, especially the aluminum hydroxide or magnesium hydroxide fillers already mentioned, and also especially organic phosphoric acid esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenylphosphate), bisphenol A bis(diphenylphosphate), ammonium polyphosphates, melamine or derivatives thereof, boron compounds or antimony compounds;

additives, especially wetting agents, leveling agents, defoamers, deaerators, stabilizers against oxidation, heat, light or UV radiation, or biocides;

and other substances customarily used in curable compositions.

Such additions may present as constituents of the first or of the second component. Substances reactive with isocyanate groups are preferably a constituent of the first component. It may be advisable to subject certain constituents to chemical or physical drying before mixing them into the respective component.

The composition preferably additionally comprises at least one further constituent, especially selected from fillers, adhesion promoters, desiccants, catalysts and stabilizers. The composition preferably comprises several such further constituents.

The composition preferably contains 1% to 50% by weight, more preferably 2% to 25% by weight, especially 5% to 15% by weight, of compounds having at least one reactive group of the formula (I), based on the sum total of the constituents reactive with isocyanate groups in the first component.

In the composition, the ratio between (i) the number of OH groups and reactive groups of the formula (I) in the compound having at least one reactive group of the formula (I) and (ii) the number of OH groups in the polyols is preferably in the range from 0.01 to 1.0, more preferably 0.025 to 0.5, especially 0.05 to 0.4.

In the composition, the ratio of the groups reactive toward isocyanates, i.e. hydroxyl groups, reactive groups of the formula (I) and any further reactive groups present, to the isocyanate groups is preferably in the range from 0.5 to 1.1, especially 0.7 to 1.05.

The consistency of the two components of the composition is suitably such that they can be well mixed by simple methods. Both liquid and pasty components are suitable for this purpose, the viscosity of the liquid or pasty components at room temperature preferably being sufficiently low that dosage and mixing can be effected in a simple manner manually or with conventional dosage systems and dynamic or static mixers. For use as coating, the two components at room temperature preferably have a fluid or only slightly structurally viscous constituency and low viscosity.

The first and second components of the composition are produced separately from one another. The constituents of the respective component are mixed here with one another with exclusion of moisture, so as to give a macroscopically homogeneous mass. Each component is stored in a separate moisture-tight container. Suitable containers are especially a drum, a container, a hobbock, a bucket, a canister, a can, a pouch, a tubular pouch, a cartridge or a tube. The components are storage-stable.

For the use of the composition, the two components and any further components present are mixed with one another shortly before or during the application. The mixing ratio is preferably chosen such that the groups reactive toward isocyanates are present in a suitable ratio to the isocyanate groups, as described above. In parts by weight, the mixing ratio between the first and second components is typically in the range from 1:2 to 20:1, especially 1:1 to 10:1.

Typically, the two components have been preformulated, such that the contents of the container correspond to the mixing ratio. If this is not the case, for example in the case of large containers, the components are suitably weighed out individually in accordance with the mixing ratio.

The two components are typically mixed with a mechanical stirrer system, especially a twin-shaft stirrer. Another possibility is continuous mixing units with static or dynamic mixers. At the mixing stage, care should be taken to ensure that the components are mixed with maximum homogeneity. In the event of inadequate mixing, local deviations from the advantageous mixing ratio will occur, which can result in a deterioration in the mechanical properties and/or blistering. If mixing precedes the application, it must be ensured that not too much time passes between the mixing of the components and the application, since the onset of reaction and the associated rise in viscosity may otherwise lead to problems, for example inadequate leveling or delayed or incomplete adhesion to the substrate.

More particularly, the open time of the composition should not be exceeded during the application.

"Open time" refers here to the time span between the mixing of the components and the end of a state of the composition suitable for processing.

The mixing is preferably effected at ambient temperature, especially at a temperature in the range from −5 to 50° C., especially 0 to 40° C.

The composition begins to cure with the mixing of the two components as a result of the onset of chemical reaction, with optional completion of curing through the action of external moisture.

In the course of curing, the reactive groups of the formula (I) react with isocyanate groups, as described above. In addition, the hydroxyl groups likewise react with isocyanate groups. Further isocyanate groups react with one another under the influence of moisture. As a result of these reactions, the composition ultimately cures to give a solid material.

The curing is preferably effected at ambient temperature, especially at a temperature in the range from −5 to 50° C., especially 0 to 40° C.

The composition has a comparatively long open time and cures to give an elastic material of high strength and stability.

The composition preferably has an open time, measured under standard climatic conditions and as described in the examples, in the range from 10 to 100 min, more preferably 15 to 80 min, especially 15 to 60 min.

The invention further provides a cured composition obtained from the composition described after the mixing of the two components and curing thereof.

The composition is suitable for a multitude of uses. It can especially be used as adhesive, sealant, coating, casting resin or spackling compound.

The composition is especially suitable as adhesive or sealant for bonding and sealing applications, in the construction and manufacturing industries and in motor vehicle construction, especially for parquet bonding, installable component bonding, cavity sealing, assembly, module bonding, vehicle body bonding, window pane bonding or joint sealing.

As coating, the composition is especially suitable for the protection of support structures made of steel-reinforced concrete or metal, or of balconies, terraces, open spaces, bridges, parking levels, or for the sealing of roofs, especially flat roofs or slightly inclined roof areas or roof gardens, or in the interior of buildings for water sealing, for example beneath tiles or ceramic plates in plumbing units or kitchens, or as floor covering in kitchens, industrial buildings or manufacturing spaces, or as seal in collection tanks, channels, shafts or wastewater treatment plants, or for the protection of surfaces as varnish or seal, or protective coating for pipes, for example, or as floor coating for sports facilities such as gymnasiums, fitness centers or track and field surfaces.

As casting resin, the composition is especially suitable for cavity sealing, as seam sealant, as binder for composites or as electrical potting compound.

As spackling compound, the composition is especially suitable for repair or for installations on buildings or articles.

For use as an adhesive or sealant, the composition at room temperature preferably has a pasty consistency with structurally viscous properties. Such a pasty sealant or adhesive is especially applied from commercial manually, pneumatically or electrically driven cartridges. Another possibility is discharge from a drum or hobbock by means of a conveying pump or an extruder, optionally by means of an application robot.

For use as coating, the composition preferably has a fluid or slightly thixotropic consistency at room temperature. It is especially applied by means of a roll, brush or spatula or by distribution by means of a roller, scraper or trowel, or it is poured or sprayed onto the substrate by means of a dosage system. In one operation, typically a layer thickness in the range from 0.5 to 3 mm, especially 1.0 to 2.5 mm, is applied.

For use as a spackling compound, the composition preferably has a pasty consistency.

Suitable substrates which can be bonded or sealed or coated with the composition are especially
- glass, glass ceramic, concrete, mortar, cement screed, fiber cement, especially fiber cement boards, brick, tile, gypsum, especially gypsum boards or anhydride screed, or natural stone, such as granite or marble;
- repair or leveling compounds based on PCC (polymer-modified cement mortar) or ECC (epoxy resin-modified cement mortar);
- metals or alloys such as aluminum, iron, steel, copper, other nonferrous metals, including surface-upgraded metals or alloys such as galvanized or chrome-plated metals;
- asphalt or bitumen;
- leather, textiles, paper, wood, wood materials bonded with resins, such as phenolic, melamine or epoxy resins, resin/textile composites or further materials called polymer composites;
- plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
- fiber-reinforced plastics, such as carbon fiber-reinforced plastics (CFP), glass fiber-reinforced plastics (GFP) and sheet molding compounds (SMC);
- insulation foams, especially made of EPS, XPS, PUR, PIR, rock wool, glass wool or foamed glass;
- coated or painted substrates, especially painted tiles, coated concrete, powder-coated metals or alloys or painted metal sheets;
- paints or varnishes, especially automotive topcoats.

If required, the substrates can be pretreated prior to application, especially by physical and/or chemical cleaning methods or the application of an activator or a primer.

It is possible to bond and/or seal two identical or two different substrates.

The application and curing of the composition affords an article bonded or sealed or coated with the composition. This article may be a built structure or part thereof, especially a civil engineering structure built above or below ground, a bridge, a roof, a staircase or a facade, or it may be an industrial good or a consumer good, especially a window, a pipe, a rotor blade of a wind turbine, a domestic appliance or a mode of transport such as, in particular, an automobile, a bus, a truck, a rail vehicle, a ship, an aircraft or a helicopter, or an installable component thereof.

The composition is preferably used as coating, preferably as coating for floors, especially in living and accommodation spaces such as offices, social facilities such as schools, nurseries or clinics, sports facilities such as gymnasiums, fitness centers or track and field surfaces, industry or storage halls, and on balconies, terraces, open spaces, bridges or parking decks.

Such a coating is preferably elastic and has high hardness and high tear propagation resistance.

For this purpose, the coating preferably has an elongation at break determined to DIN EN 53504 as described in the examples of at least 40%, more preferably at least 50%, especially at least 60%.

For this purpose, the coating preferably has a tensile strength determined to DIN EN 53504 as described in the examples in the range from 10 to 40 MPa.

For this purpose, the coating preferably has a modulus of elasticity (in the range from 0.5% to 5% elongation) determined to DIN EN 53504 as described in the examples of at least 150 MPa, preferably at least 250 MPa, especially at least 300 MPa.

For this purpose, the coating preferably has a tear propagation resistance determined to DIN ISO 34-1 as described in the examples of at least 65 N/mm, especially at least 70 N/mm.

For this purpose, the coating preferably has a Shore D hardness determined to DIN 53505 as described in the examples of at least 60, more preferably at least 63, especially at least 65.

Further preferably, the composition is used as coating for the sealing of roof areas. Such a coating preferably has good crack-bridging properties with high elongation and high tear propagation resistance coupled with moderate strength.

For this purpose, the coating preferably has an elongation at break determined to DIN EN 53504 as described in the examples of at least 80%, more preferably at least 120%, especially at least 160%.

For this purpose, the coating preferably has a tensile strength determined to DIN EN 53504 as described in the examples in the range from 2 to 20 MPa, especially 4 to 15 MPa.

For this purpose, the coating preferably has a modulus of elasticity (in the range from 0.5% to 5% elongation) determined to DIN EN 53504 as described in the examples of at most 50 MPa, preferably at most 30 MPa, especially at most 20 MPa.

For this purpose, the coating preferably has a tear propagation resistance determined to DIN ISO 34-1 as described in the examples of at least 6 N/mm, especially at least 8 N/mm.

The coating preferably has a Shore A hardness determined to DIN 53505 as described in the examples in the range from 50 to 85, more preferably 60 to 80, especially 65 to 80.

EXAMPLES

Working examples are presented hereinbelow, which are intended to further elucidate the invention described. The invention is of course not limited to these described working examples.

"Standard climatic conditions" refer to a temperature of 23±1° C. and a relative air humidity of 50±5%.

The chemicals used, unless stated otherwise, were from Sigma-Aldrich and were used without further pretreatment.

Preparation of Compounds Having Reactive Groups of the Formula (I):

Amine value was determined by titration (with 0.1N HClO$_4$ in acetic acid versus crystal violet).

Viscosity was measured with a thermostated Rheotec RC30 cone-plate viscometer (Brookfield, cone diameter 50 mm, cone angle 1°, cone tip-plate distance 0.05 mm, shear rate 10 s$^{-1}$).

Infrared spectra (FT-IR) were measured as undiluted films on a Nicolet iS5 FT-IR instrument from Thermo Scientific equipped with a horizontal ATR measurement unit with a diamond crystal. The absorption bands are reported in wavenumbers (cm$^{-1}$).

$^1$H- and $^{13}$C NMR spectra were measured at room temperature on a spectrometer of the Bruker Ascend type at 400.14 MHz ($^1$H) or 100.63 MHz ($^{13}$C); the chemical shifts δ are reported in ppm relative to tetramethylsilane (TMS). Coupling constants J are reported in Hz. No distinction was made between true coupling and pseudo-coupling patterns.

Compound H-1: N,N'-Bis(ethylcrotonat-3-yl)-α,ω-polyoxypropylenediamine 136.5 g (1.05 mol) of ethyl acetoacetate was initially charged in a round-bottom flask under a nitrogen atmosphere. While stirring, 153.0 g (0.50 mol) of α,ω-polyoxypropylenediamine having average molecular weight M$_n$ of 306 g/mol (mixture of 84.1 g of Jeffamine® D-230 and 68.9 g of Jeffamine® D-400, both from Huntsman) was added, in the course of which the temperature of the reaction mixture was kept between 15 and 25° C. by means of cooling. Subsequently, the reaction mixture was stirred at room temperature for 20 min and then the volatile constituents were removed at 80° C. and a reduced pressure of 10 mbar. A clear, pale yellow, slightly odorous liquid having a viscosity at 20° C. of 460 mPa·s and an amine value of 211 mg KOH/g was obtained. On the basis of the data from $^1$H NMR and $^{13}$C NMR, compound H-1 is mainly in the form of the enamino ester.

$^1$H NMR (CDCl$_3$): 8.54 (s, 2H, NH), 4.40 (s, 2H, C=CH—C(O)O), 4.07 (q, 4H, O—CH$_2$—CH$_3$), 3.81-3.14 (m, 15H, CH$_2$—O and CH—O of polyether), 1.95 (s, 6H, N—C(CH$_3$)=CH), 1.24 (t, 6H, CH$_3$—CH$_2$—O), 1.24-1.22 (m, 6H, CH$_3$—CH—N), 1.17-1.06 (m, 9H, CH$_3$—CH—O of polyether).

$^{13}$C NMR (CDCl$_3$) (evaluated only in the range of 80 to 180 ppm): 170.5 (O—C(O) ester), 161.3 (CH=C—NH), 82.3 (CH=C—NH).

FT-IR: 2973, 2931, 2871, 1651, 1600, 1498, 1444, 1375, 1362, 1300, 1263, 1133, 1094, 1056, 1026, 976, 963, 783, 697.

Compound H-2: N,N'-Bis(diethylcrotonamid-3-yl)-α,ω-polyoxypropylenediamine

Prepared as described for compound H-1, except using 165.1 g (1.05 mol) of N,N-diethylacetoacetamide in place of ethyl acetoacetate. A clear, yellow-orange, slightly odorous liquid having a viscosity at 20° C. of 2'500 mPa·s and an amine value of 198 mg KOH/g was obtained.

FT-IR: 2969, 2929, 2870, 1601, 1578, 1506, 1477, 1443, 1405, 1373, 1358, 1312, 1276, 1253, 1139, 1095, 1081, 1019, 959, 927, 827, 769, 693.

Compound H-3: N,N'-Bis(pent-3-en-2-on-4-yl)-α,ω-polyoxypropylenediamine

Prepared as described for compound H-1, except using 105.1 g (1.05 mol) of acetylacetone in place of ethyl acetoacetate. A clear, yellowish, slightly odorous liquid having a viscosity at 20° C. of 435 mPa·s and an amine value of 249 mg KOH/g was obtained.

FT-IR: 2970, 2870, 1607, 1570, 1512, 1441, 1353, 1296, 1101, 1009, 960, 930, 795, 735.

Compound H-4: N,N'-Bis(ethylcrotonat-3-yl)-1,3-bis(aminomethyl)benzene 136.5 g (1.05 mol) of ethyl acetoacetate and 68.1 g (0.5 mol) of 1,3-bis(aminomethyl)benzene (from Mitsubishi Gas Chem.) were converted as described for compound H-1. A clear, yellow, slightly odorous liquid having a viscosity at 20° C. of 4'800 mPa·s and an amine value of 306 mg KOH/g was obtained, which crystallized to give a solid after a storage time of several months at room temperature.

FT-IR: 3290, 2977, 2931, 2900, 2869, 1646, 1600, 1499, 1438, 1385, 1362, 1289, 1265, 1230, 1169, 1147, 1110, 1057, 1022, 830, 782, 694.

Compound H-5: N-(Ethylcrotonat-3-yl)-2-(2-aminoethoxy)ethan-1-ol 136.5 g (1.05 mol) of ethyl acetoacetate and 105.0 g (1.0 mol) of 2-(2-aminoethoxy)ethan-1-ol were converted as described for compound H-1. A clear, pale yellow, slightly odorous liquid having a viscosity at 20° C. of 118 mPa·s and an amine value of 253 mg KOH/g was obtained.

FT-IR: 3426 (br), 3296, 2976, 2929, 2869, 1646, 1596, 1503, 1443, 1385, 1363, 1257, 1233, 1171, 1123, 1095, 1054, 1019, 979, 922, 887, 783, 699.

Compound H-6: N-(Ethylcrotonat-3-yl)-2-aminoethanol 136.5 g (1.05 mol) of ethyl acetoacetate and 62.1 g (1.0 mol) of 2-aminoethanol were converted as described for compound H-1. A clear, pale yellow, slightly odorous liquid having a viscosity at 20° C. of 127 mPa·s and an amine value of 325 mg KOH/g was obtained.

FT-IR: 3398 (br), 3303, 2978, 2933, 2875, 1646, 1634, 1593, 1503, 1441, 1385, 1364, 1269, 1253, 1218, 1169, 1125, 1095, 1051, 1017, 979, 964, 881, 782, 696.

Compound H-7: α,ω-Polyoxypropylenebis(3-(N-cyclohexylamino) but-2-enoate)

A round-bottom flask was initially charged with 316.1 g (0.79 mol) of polyoxypropylenediol having average molecular weight M$_n$ of about 400 g/mol (Voranol® P 400, from Dow). 249.8 g (1.58 mol) of tert-butyl acetoacetate and 0.5 g of methanesulfonic acid were added while stirring. Subsequently, the volatile constituents (tert-butanol) were removed at 80 to 120° C. and a reduced pressure of 5 mbar. The α,ω-polyoxypropylenebis(acetoacetate) intermediate was obtained in the form of a clear, pale yellow liquid having a viscosity at 20° C. of 126 mPa·s. To an initial charge of 85.2 g (0.15 mol) of the intermediate thus prepared in a round-bottom flask was added 29.8 g (0.30 mol) of cyclohexylamine while stirring. Subsequently, the reaction mixture was stirred at room temperature for 20 min and then the volatile constituents were removed at 80° C. and a reduced pressure of 10 mbar. A clear, orange-yellow, slightly odorous liquid having a viscosity at 20° C. of 8'400 mPa·s and an amine value of 140 mg KOH/g was obtained. FT-1R:

2971, 2929, 2855, 1647, 1604, 1496, 1448, 1374, 1346, 1305, 1271, 1237, 1171, 1149, 1103, 1017, 997, 983, 927, 782, 695.

Compound H-8: N,N'-Bis(ethylcrotonat-3-yl)-2,2 (4),4-trimethylhexane-1,6-diamine 136.5 g (1.05 mol) of ethyl acetoacetate and 79.2 g (0.5 mol) of 2,2(4),4-trimethylhexane-1,6-diamine (Vestamin® TMD, from Evonik) were converted as described for compound H-1. A clear, yellow-orange, slightly odorous liquid having a viscosity at 20° C. of 874 mPa·s and an amine value of 290 mg KOH/g was obtained.

Compound H-9

136.5 g (1.05 mol) of ethyl acetoacetate and 162.0 g (1.0 mol of amino groups) of polyoxypropylenetriamine having an average molecular weight $M_n$ of about 440 g/mol (Jeffamine® T-403, from Huntsman) were converted as described for compound H-1. A clear, yellow, slightly odorous liquid having a viscosity at 20° C. of 4'870 mPa·s and an amine value of 199 mg KOH/g was obtained.

Compound H-10: α,ω-Polyoxypropylenebis(3-(N-2-hydroxyethylamino) but-2-enoate)

85.2 g (0.15 mol) of the (α,ω-polyoxypropylenebis(acetoacetate)) intermediate prepared for compound H-7 was reacted with 18.3 g (0.30 mol) of 2-aminoethanol as described for compound H-7. A clear, orange, slightly odorous liquid having a viscosity at 20° C. of 6'710 mPa·s and an amine value of 177 mg KOH/g was obtained.

Compound H-11: α,ω-Polyoxypropylenebis(3-aminobut-2-enoate)

To an initial charge of 184.20 g (0.32 mol) of the (α,ω-polyoxypropylenebis(acetoacetate)) intermediate prepared for compound H-7 in a round-bottom flask equipped with reflux condenser and water separator were added 54.72 g (0.90 mol) of 28% aqueous ammonia solution, 200 ml of toluene and 1 ml of formic acid, and the mixture was boiled at reflux for 3 hours while separating water out. A total of 39 ml of water was collected. Subsequently, the volatile constituents were removed at 140° C. and standard pressure, followed by 2 hours on a rotary evaporator (bath temperature 120° C., reduced pressure of 8 mbar). 176.95 g of a clear, orange, slightly odorous liquid having a viscosity at 20° C. of 175 mPa·s was obtained.

Compounds H-1 to H-6, H-8 and H-9 are compounds of the formula (II), with compounds H-1, H-2, H-3 and H-9 conforming to the formula (II a) and compounds H-5 and H-6 to the formula (II b). Compounds H-7 and H-10 are compounds of the formula (III), with compound H-10 conforming to the formula (III a).

Compound H-11 does not conform to the formula (III) and serves as comparison for compounds of the formula (III).

Preparation of Compounds as Comparison:

Compound R-1 (Dialdimine)

298.7 g (1.05 mol) of 2,2-dimethyl-3-lauroyloxypropanal was initially charged in a round-bottom flask under a nitrogen atmosphere. Then 153.0 g (0.50 mol) of polyoxypropylenediamine having average molecular weight $M_n$ of 306 g/mol (mixture of 84.1 g of Jeffamine® D-230 and 68.9 g of Jeffamine® D-400, both from Huntsman) was added with good stirring, and then the volatile constituents were removed at 80° C. and a reduced pressure of 10 mbar. A clear, pale yellow, odorless liquid having a viscosity at 20° C. of 122 mPa·s and an amine value of 129 mg KOH/g was obtained.

Compound R-2 (Dialdimine)

193.5 g (1.05 mol) of dodecanal (lauraldehyde) was converted as described for compound R-1.

Prepared as described for compound R-1, except using 193.5 g (1.05 mol) of lauraldehyde rather than 2,2-dimethyl-3-lauroyloxypropanal. A clear, pale yellow, slightly odorous liquid having a viscosity at 20° C. of 147 mPa·s and an amine value of 171 mg KOH/g was obtained.

Compound R-3 (Diketimine)

Prepared as described for compound H-1, except using 103.1 g (1.05 mol) of cyclohexanone in place of ethyl acetoacetate. A clear, yellow, intensely odorous liquid having a viscosity at 20° C. of 99 mPa·s and an amine value of 253 mg KOH/g was obtained.

Production of Two-Component Compositions:

Substances Used:

Setathane® D 1150: branched polyol, reaction product of castor oil with ketone resin, OH equivalent weight 360 g/eq (from Allnex)

Desmophen® 4011 T: polyether triol having OH equivalent weight 102 g/eq (from Covestro)

Voranol® CP 4755 EO-endcapped polyoxypropylenetriol, OH number 35 mg KOH/g (from Dow)

Lupranol® 4003/1 EO-endcapped polyoxypropylenetriol with 45% by weight of grafted SAN polymer, OH number 20.0 mg KOH/g (from BASF)

Desmodur® VL polyisocyanate based on MDI, NCO equivalent weight 133 g/eq (from Covestro)

Desmodur® CD-L modified polyisocyanate based on MDI, NCO equivalent weight 142 g/eq (from Covestro)

Zeolite paste 3 Å molecular sieve powder in castor oil, 1:1 by weight

BYK-E 410 rheology additive (from Altana)

Compositions Z-1 to Z-31 and Ref-1 to Ref-14: (Compositions for high mechanical stress, suitable as floor coating)

For each composition, the ingredients specified in table 1 or 2 were processed in the specified amounts (in parts by weight) of the first component ("component-1") by means of a centrifugal mixer (SpeedMixer™ DAC 150, FlackTek Inc.) at 1600 rpm for 3 min with exclusion of moisture to give a homogeneous liquid and stored for at least 2 h. Subsequently, the amount of the second component specified in table 1 was added to the first component and the two components were processed by means of the centrifugal mixer with exclusion of moisture at 1600 rpm for 3 minutes to give a homogeneous liquid, which was immediately tested as follows:

Open time was determined by using a spatula to agitate 20 grams of the mixed composition at regular intervals. When the composition felt for the first time as if it had thickened too much for feasible processing, the open time from the start of the mixing process was read off.

To determine the mechanical properties, the composition was poured onto a PTFE-coated film to give a film of thickness 2 mm, which was cured by storage under standard climatic conditions for 14 days, and a few dumbbells having a length of 75 mm with a bar length of 30 mm and a bar width of 4 mm were punched out of the film and these were tested in accordance with DIN EN 53504 at a strain rate of 200 mm/min for maximum tensile strength, elongation at break, and modulus of elasticity (between 0.5-5% elongation). Furthermore, a number of test specimens were punched out for determination of tear propagation resistance and were tested in accordance with DIN ISO 34-1, Method B (angular test specimens) at a strain rate of 500 mm/min.

For determination of Shore hardness to DIN 53505, cylindrical test specimens (diameter 20 mm, thickness 5 mm) were produced from the still-liquid reaction mixture, and were stored before the measurement under standard climatic conditions for 14 d. Each of the results is specified as being a Shore A or Shore D value.

Appearance was assessed visually on the films which had been produced under standard climatic conditions for the determination of the mechanical properties.

"Nice" describes a blister-free film having a homogeneous, non-sticky surface. "Uneven" describes a film which has not leveled out owing to the short open time. Odor was assessed by smelling by nose at a distance of 2 cm from the freshly produced films. "No" means that no odor was perceptible. "Yes" means that an odor was clearly perceptible. "Strong" means that an intense, solvent-like odor was perceptible.

The results are reported in table 1 or 2.

The compositions labeled "Ref" are comparative examples.

TABLE 1

Composition (in parts by weight) and properties of Z-1 t- Z-26 Ref-1 to Ref-12

| Composition | Ref-1 | Z-1 | Z-2 | Z-3 | Z-4 | Z-5 | Z-6 | Ref-2 |
|---|---|---|---|---|---|---|---|---|
| Component-1: | | | | | | | | |
| Setathane ® D 1150 | 90.8 | 89.8 | 88.5 | 86.2 | 81.7 | 68.1 | 45.4 | — |
| Desmophen ® 4011 T | 4.0 | 4.0 | 3.9 | 3.8 | 3.6 | 3.0 | 2.0 | — |
| Compound | — | H-1 | H-1 | H-1 | H-1 | H-1 | H-1 | H-1 |
| | | 1.0 | 2.5 | 5.0 | 10.0 | 25.0 | 50.0 | 100.00 |
| Zeolite paste | 5.0 | 5.0 | 4.9 | 4.8 | 4.5 | 3.8 | 2.5 | — |
| BYK-E 410 | 0.2 | 0.2 | 0.2 | 0.2 | 0.2 | 0.2 | 0.1 | — |
| Component-2: | | | | | | | | |
| Desmodur ® VL | 41.0 | 41.0 | 41.0 | 42.0 | 43.0 | 44.0 | 47.0 | 52.0 |
| Open time [min] | 40 | 32 | 29 | 26 | 24 | 20 | 10 | 5 |
| Tensile strength [MPa] | 20.3 | 19.2 | 19.2 | 19.6 | 21.4 | 25.5 | 32.1 | n.d. |
| Elongation at break [%] | 92 | 101 | 101 | 93 | 97 | 62 | 43 | n.d. |
| Modulus of elasticity [MPa] | 226 | 233 | 227 | 300 | 372 | 499 | 657 | n.d. |
| Tear propagation resistance [N/mm] | 65.0 | 64.2 | 65.8 | 72.2 | 79.7 | 95.0 | 105.6 | n.d. |
| Shore D | 59 | 66 | 65 | 69 | 71 | 69 | 73 | 71 |
| Appearance | nice | nice | nice | nice | nice | nice | nice | uneven |
| Odor | no | no | no | no | no | no | no | no |

| Composition | Z-7 | Z-8 | Z-9 | Z-10 | Z-11 | Z-12 |
|---|---|---|---|---|---|---|
| Component-1: | | | | | | |
| Setathane ® D 1150 | 88.5 | 86.2 | 81.7 | 88.5 | 86.2 | 81.7 |
| Desmophen ® 4011 T | 3.9 | 3.8 | 3.6 | 3.9 | 3.8 | 3.6 |
| Compound | H-2 | H-2 | H-2 | H-3 | H-3 | H-3 |
| | 2.5 | 5.0 | 10.0 | 2.5 | 5.0 | 10.0 |
| Zeolite paste | 4.9 | 4.8 | 4.5 | 4.9 | 4.8 | 4.5 |
| BYK 410 | 0.2 | 0.2 | 0.2 | 0.2 | 0.2 | 0.2 |
| Component-2: | | | | | | |
| Desmodur ®VL | 41.0 | 41.0 | 42.0 | 41.0 | 42.0 | 43.0 |
| Open time [min] | 40 | 30 | 20 | 35 | 25 | 20 |
| Tensile strength [MPa] | 15.6 | 18.9 | 18.8 | 19.4 | 15.2 | 23.5 |
| Elongation at break [%] | 79 | 97 | 77 | 89 | 57 | 49 |
| Modulus of elasticity [MPa] | 193 | 233 | 346 | 228 | 264 | 451 |
| Tear propagation resistance [N/mm] | 67 | 69 | 81 | 69 | 73 | 92 |
| Shore D | 65 | 65 | 70 | 64 | 69 | 70 |
| Appearance | nice | nice | nice | nice | nice | nice |
| Odor | no | no | no | no | no | no |

TABLE 1-continued

| Composition | Z-13 | Z-14 | Z-15 | Z-16 | Z-17 | Z-18 | Z-19 | Z-20 |
|---|---|---|---|---|---|---|---|---|
| Component-1: | | | | | | | | |
| Setathane ® D 1150 | 88.5 | 86.2 | 81.7 | 88.5 | 86.2 | 81.7 | 88.5 | 86.2 |
| Desmophen 4011 T | 3.9 | 3.8 | 3.6 | 3.9 | 3.8 | 3.6 | 3.9 | 3.8 |
| Compound | H-4 | H-4 | H-4 | H-5 | H-5 | H-5 | H-6 | H-6 |
|  | 2.5 | 5.0 | 10.0 | 2.5 | 5.0 | 10.0 | 2.5 | 5.0 |
| Zeolite paste | 4.9 | 4.8 | 4.5 | 4.9 | 4.8 | 4.5 | 4.9 | 4.8 |
| BYK 410 | 0.2 | 0.2 | 0.2 | 0.2 | 0.2 | 0.2 | 0.2 | 0.2 |
| Component-2: | | | | | | | | |
| Desmodur ® VL | 42.0 | 43.0 | 45.0 | 43.0 | 45.0 | 49.0 | 44.0 | 47.0 |
| Open time [min] | 35 | 30 | 25 | 40 | 35 | 30 | 40 | 35 |
| Tensile strength [MPa] | 17.7 | 19.4 | 29.8 | 21.5 | 24.4 | 33.4 | 21.6 | 29.0 |
| Elongation at break [%] | 75 | 66 | 38 | 95 | 85 | 72 | 89 | 72 |
| Modulus of elasticity [MPa] | 257 | 357 | 601 | 367 | 486 | 674 | 420 | 538 |
| Tear propagation resistance [N/mm] | 72 | 74 | 89 | 76 | 83 | n.d. | 80 | 88 |
| Shore D | 65 | 70 | 73 | 61 | 68 | 72 | 68 | 73 |
| Appearance | nice | nice | nice | nice | nice | nice | nice | nice |
| Odor | no | no | no | no | no | no | no | no |

| Composition | Z-21 | Z-22 | Z-23 | Z-24 | Z-25 | Z-26 |
|---|---|---|---|---|---|---|
| Component-1: | | | | | | |
| Setathane ® D 1150 | 89.8 | 88.5 | 86.2 | 81.6 | 86.2 | 81.7 |
| Desmophen ® 4011 T | 4.0 | 3.9 | 3.8 | 3.6 | 3.8 | 3.6 |
| Compound | H-7 | H-7 | H-7 | H-7 | H-10 | H-10 |
|  | 1.0 | 2.5 | 5.0 | 10.0 | 5.0 | 10.0 |
| Zeolite paste | 4.9 | 4.8 | 4.7 | 4.5 | 4.8 | 4.5 |
| BYK 410 | 0.2 | 0.2 | 0.2 | 0.2 | 0.2 | 0.2 |
| Component-2: | | | | | | |
| Desmodur ® VL | 41.0 | 41.0 | 41.0 | 41.0 | 43.0 | 45.0 |
| Open time [min] | 40 | 35 | 28 | 24 | 28 | 23 |
| Tensile strength [MPa] | 20.8 | 20.4 | 20.6 | 21.0 | 22.9 | 21.1 |
| Elongation at break [%] | 93 | 92 | 94 | 92 | 101 | 74 |
| Modulus of elasticity [MPa] | 319 | 307 | 322 | 385 | 282 | 348 |
| Tear propagation resistance [N/mm] | 73 | 69 | 73 | 75 | 71 | 75 |
| Shore D | 67 | 66 | 70 | 69 | 70 | 72 |
| Appearance | nice | nice | nice | nice | nice | nice |
| Odor | no | no | no | no | no | no |

| Composition | Ref-3 | Ref-4 | Ref-5 | Ref-6 | Ref-7 |
|---|---|---|---|---|---|
| Component-1: | | | | | |
| Setathane ® D 1150 | 88.4 | 86.2 | 88.5 | 86.2 | 81.7 |
| Desmophen ® 4011 T | 3.9 | 3.8 | 3.9 | 3.8 | 3.6 |
| Compound | Et 300[1] | Et 300[1] | R-1 | R-1 | R-1 |
|  | 2.5 | 5.0 | 2.5 | 5.0 | 10.0 |
| Zeolite paste | 4.9 | 4.8 | 4.9 | 4.8 | 4.5 |
| BYK 410 | 0.2 | 0.2 | 0.2 | 0.2 | 0.2 |
| Component-2: | | | | | |
| Desmodur ® VL | 43.0 | 45.0 | 41.0 | 41.0 | 40.0 |
| Open time [min] | 10 | <4 | 40 | 45 | 50 |
| Tensile strength [MPa] | n.d. | n.d. | 21.3 | 17.5 | 13.2 |
| Elongation at break [%] | n.d. | n.d. | 101 | 88 | 91 |
| Modulus of elasticity [MPa] | n.d. | n.d. | 190 | 135 | 55 |
| Tear propagation resistance [N/mm] | n.d. | n.d. | 60 | 50 | 31 |
| Shore D | 58 | 50 | 57 | 54 | 43 |
| Appearance | uneven | uneven | nice | nice | nice |
| Odor | yes | yes | no | no | no |

TABLE 1-continued

| Composition | Ref-8 | Ref-9 | Ref-10 | Ref-11 | Ref-12 |
|---|---|---|---|---|---|
| Component-1: | | | | | |
| Setathane ® D 1150 | 88.5 | 86.2 | 81.7 | 88.5 | 86.2 |
| Desmophen ® 4011 T | 3.9 | 3.8 | 3.6 | 3.9 | 3.8 |
| Compound | R-2 | R-2 | R-2 | R-3 | R-3 |
| | 2.5 | 5.0 | 10.0 | 2.5 | 5.0 |
| Zeolite paste | 4.9 | 4.8 | 4.5 | 4.9 | 4.8 |
| BYK 410 | 0.2 | 0.2 | 0.2 | 0.2 | 0.2 |
| Component-2: | | | | | 42.0 |
| Desmodur ® VL | 41.0 | 41.0 | 41.0 | 41.0 | |
| Open time [min] | 20 | 20 | 15 | 15 | 10 |
| Tensile strength [MPa] | 18.5 | 17.6 | 14.8 | 15.3 | 14.5 |
| Elongation at break [%] | 85 | 85 | 85 | 70 | 59 |
| Modulus of elasticity [MPa] | 176 | 136 | 87 | 172 | 222 |
| Tear propagation resistance [N/mm] | 57 | 51 | 41 | 59 | 72 |
| Shore D | 60 | 59 | 57 | 60 | 67 |
| Appearance | nice | nice | nice | nice | nice |
| Odor | no | no | no | strong | strong |

"n.d." stands for "not determined" (reaction too fast)
[1]Ethacure ® 300 (3,5-dimethylthio-2,4(6)-tolylenediamine, from Albemarle)

It is apparent from table 1 that the inventive compounds H-1 to H-7, by comparison with reference composition Ref-1, even in the case of a small use amount, brought about a distinct increase in modulus of elasticity and in tear propagation resistance, coupled with similar or higher tensile strength.

Particularly good properties were achieved with the preferred compounds H-1, H-5 and H-6, which conform to the formulae (II a) and (II b). Compositions Z-3 and Z-4 comprising compound H-1 (formula II a), with unchanged high tensile strength and elongation at break, enabled a distinct increase in modulus of elasticity and tear propagation resistance, as did compositions Z-16, Z-17 and Z-19 comprising compound H-5 or H-6 (formula II b), and these additionally had a similarly long open time to reference composition Ref-1.

Compound H-4, which does not conform to the preferred formulae (II a) or (II b), resulted in a reduction in elongation at break (Z-13 to Z-15).

TABLE 2

Composition (in parts by weight) and properties of Z-27 to Z-31 and Ref-13 to Ref-14

| Composition | Ref-13 | Z-27 | Z-28 | Z-29 | Z-30 | Ref-14 | Z-31 |
|---|---|---|---|---|---|---|---|
| Component-1: | | | | | | | |
| Setathane ® D 1150 | 91.0 | 82.4 | 87.5 | 86.2 | 81.5 | — | — |
| Desmophen ® 4011 T | 4.0 | 2.6 | 2.5 | 3.8 | 3.5 | 4.0 | 4.0 |
| Voranol ® CP 4755 | — | — | — | — | — | 82.0 | 73.4 |
| Butane-1,4-diol | — | — | — | — | — | 9.0 | 7.6 |
| Compound | — | H-1 | H-8 | H-11 | H-11 | — | H-1 |
| | | 10.0 | 5.0 | 5.0 | 10.0 | | 10.0 |
| Zeolite paste | 5.0 | 5.0 | 5.0 | 5.0 | 5.0 | 5.0 | 5.0 |
| Component-2: | | | | | | | |
| Desmodur ® VL | 41.0 | 41.0 | 41.0 | 41.0 | 41.0 | 41.0 | 41.0 |
| Open time [min] | 53 | 37 | 22 | 28 | 51 | 93 | 48 |
| Tensile strength [MPa] | 21.3 | 22.8 | 19.0 | 19.3 | 18.4 | 3.2 | 4.6 |
| Elongation at break [%] | 118 | 113 | 105 | 115 | 119 | 92 | 129 |
| Modulus of elasticity [MPa] | 182 | 276 | 162 | 119 | 85 | 3.6 | 5.4 |
| Tear propagation resistance [N/mm] | 62.6 | 83.2 | 53.7 | 42.8 | 39.8 | 5.1 | 7.5 |
| Shore | 98A | 99A | 68D | 60D | 61D | 54A | 63A |
| Appearance | nice | nice | nice | nice | nice | nice | nice |
| Odor | no | no | no | no | no | no | no |

It is apparent from table 2 that particularly high strengths coupled with high elongation at break are achieved with the castor oil-based polyol Setathane® D 1150 (Ref-13 and Z-27 to Z-30), whereas a system comprising a combination of polyether triol and butanediol, with similar extensibility, showed significantly lower strength (Ref-14 and Z-31). For each of the systems, the compound H-1 achieves a distinct increase in modulus of elasticity and in tear propagation resistance (Z-27 compared to Ref-13 and Z-31 compared to Ref-14).

Composition Z-28 comprising compound H-8, which does not conform to the preferred formulae (II a) or (II b), showed a short open time and no increase in modulus of elasticity or tear propagation resistance.

Compound H-11, the preparation of which is particularly complex and which does not conform to the preferred formula (III), likewise did not increase either the modulus of elasticity or the tear propagation resistance (Z-29 and Z-30 compared to Ref-13).

Compositions Z-32 to Z-41 and Ref-15 to Ref-16: (Coatings with High Crack Bridging, Suitable as Roof Seal)

For each composition, the ingredients of the first component specified in table 3 were produced and mixed with the amount of the second component specified in table 3, as described for composition Z-1.

The mixed composition was tested in each case as described for composition Z-1.

The results are reported in table 3.

The compositions labeled "Ref" are comparative examples.

TABLE 3

Composition (in parts by weight) and properties of Z-32 to Z-41 and Ref-15 to Ref-16

| Composition | Ref-15 | Z-32 | Z-33 | Ref-16 | Z-34 | Z-35 |
|---|---|---|---|---|---|---|
| Comp.-1: | | | | | | |
| Voranol® CP 4755 | 74.5 | 66.0 | 65.3 | 58.0 | 53.8 | 49.5 |
| Lupranol® 4003/1 | — | — | — | 30.0 | 30.0 | 30.0 |
| Chalk | 13.5 | 13.5 | 13.5 | — | — | — |
| Butane-1,4-diol | 7.0 | 5.5 | 6.2 | 7.0 | 6.2 | 5.5 |
| Compound | — | H-1 10.0 | H-7 10.0 | — | H-1 5.0 | H-10 10.0 |
| Zeolite paste | 5.0 | 5.0 | 5.0 | 5.0 | 5.0 | 5.0 |
| Comp.-2: | | | | | | |
| Desmodur® CD-L | 30.0 | 30.0 | 30.0 | 30.0 | 30.0 | 30.0 |
| Open time [min] | 79 | 60 | 43 | 54 | 48 | 44 |
| Tensile strength [MPa] | 1.4 | 8.5 | 1.8 | 2.1 | 4.5 | 13.6 |
| Elongation at break [%] | 40 | 207 | 152 | 55 | 222 | 257 |
| Modulus of elasticity [MPa] | 9.2 | 15.3 | 5.0 | 12.5 | 7.3 | 13.6 |
| Tear propagation resistance [N/mm] | 4.9 | 14.8 | 8.1 | 8.2 | 10.2 | 14.3 |
| Shore A | 59 | 81 | 58 | 76 | 70 | 77 |
| Appearance | nice | nice | nice | nice | nice | nice |
| Odor | no | no | no | no | no | no |

| Composition | Z-36 | Z-37 | Z-38 | Z-39 | Z-40 | Z-41 |
|---|---|---|---|---|---|---|
| Comp.-1: | | | | | | |
| Voranol® CP 4755 | 55.9 | 49.6 | 56.2 | 54.3 | 53.6 | 49.2 |
| Lupranol® 4003/1 | 30.0 | 30.0 | 30.0 | 30.0 | 30.0 | 30.0 |
| Chalk | — | — | — | — | — | — |
| Butane-1,4-diol | 6.6 | 5.4 | 6.3 | 5.7 | 6.4 | 5.8 |
| Compound | H-9 2.5 | H-9 10.0 | H-10 2.5 | H-10 5.0 | H-11 5.0 | H-11 10.0 |
| Zeolite paste | 5.0 | 5.0 | 5.0 | 5.0 | 5.0 | 5.0 |
| Comp.-2: | | | | | | |
| Desmodur® CD-L | 30.0 | 30.0 | 30.0 | 30.0 | 30.0 | 30.0 |
| Open time [min] | 48 | 35 | 45 | 36 | 93 | 90 |
| Tensile strength [MPa] | 4.0 | 11.0 | 6.6 | 8.4 | 4.8 | 7.4 |
| Elongation at break [%] | 148 | 209 | 187 | 174 | 196 | 273 |
| Modulus of elasticity [MPa] | 9.8 | 11.1 | 9.1 | 10.1 | 10.7 | 11.0 |
| Tear propagation resistance [N/mm] | 9.7 | 12.4 | 9.8 | 10.6 | 11.4 | 12.9 |
| Shore A | 73 | 78 | 76 | 78 | 74 | 74 |
| Appearance | nice | nice | nice | nice | nice | nice |
| Odor | no | no | no | no | no | no |

It is apparent from table 3 that the system comprising the SAN polymer-containing polyol Lupranol® 4003/1 enables higher tensile strengths coupled with high tear propagation resistance compared to a system comprising a conventional polyol and the corresponding amount of chalk in place of the SAN polymer, with a distinct improvement in mechanical properties in both systems by means of compound H-1, especially in relation to elongation, tensile strength and tear propagation resistance (Z-34 and Z-35 compared to Ref-16 and Z-32 compared to Ref-15). The further inventive compounds H-7, H-9, H-10 and H-11 also show a positive effect on mechanical properties, while compound H-11, the preparation of which is particularly complex and which does not conform to the preferred formula (III), results in an undesirably long open time (Z-40 and Z-41 compared to Ref-16). For good processability, an open time in the range from about 30 to 60 minutes is particularly advantageous.

Compound H-10, which conforms to the particularly preferred formula (III a), shows particularly high strength even in the case of a very small use amount (Z-38).

The invention claimed is:

1. A composition comprising:
   a first component containing:
     at least one polyol, and
     at least one of the formula (II a)

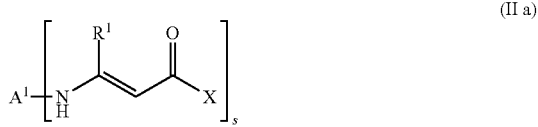

(II a)

where:
   $R^1$ is an alkyl radical having 1 to 8 carbon atoms or a phenyl radical,
   s is 2 or 3,
   $A^1$ is a di- or trivalent organic radical having 6 to 100 carbon atoms and at least 2 ether groups,
   X is:
     an alkyl or alkoxy radical having 1 to 8 carbon atoms, or
     a radical of the formula $—NR^2R^3$ where $R^2$ and $R^3$ are each independently H or an alkyl, cycloalkyl, aralkyl or aryl radical optionally having ether oxygen and having 1 to 12 carbon atoms, or together are an alkylene radical optionally having ether oxygen and having 3 to 6 carbon atoms, and
   the compound has an average molecular weight $M_n$ of not more than 2,500 g/mol, and
   a second component containing at least one aromatic polyisocyanate and/or at least one polymer containing aromatic isocyanate groups.

2. The composition as claimed in claim 1, wherein:
   s is 2 and $A^1$ is α,ω-polyoxypropylene having an average molecular weight $M_n$ in the range from 170 to 500 g/mol, or
   s is 3 and $A^1$ is a trivalent polyoxypropylene radical started from trimethylolpropane or glycerol and having an average molecular weight $M_n$ in the range from 300 to 500 g/mol.

3. The composition as claimed in claim 1, wherein the polyol has an average molecular weight $M_n$ in the range from 500 to 10,000 g/mol and an average OH functionality in the range from 1.8 to 3.

4. The composition as claimed in claim 1, wherein the polyol comprises at least one fatty acid-based polyol having an average molecular weight $M_n$ in the range from 500 to 2,000 g/mol.

5. The composition as claimed in claim 1, wherein the polyol comprises at least one polyether triol having an average molecular weight $M_n$ in the range from 3,000 to 6,000 g/mol.

6. The composition as claimed in claim 1, wherein the second component comprises diphenylmethane 4,4'-diisocyanate.

7. The composition as claimed in claim 1, further comprising at least one further constituent selected from fillers, adhesion promoters, desiccants, catalysts and stabilizers.

8. The composition as claimed in claim 1, containing 1% to 50% by weight of compounds of the formula (II a), based on the sum total of the constituents reactive with isocyanate groups in the first component.

9. A cured composition obtained from the composition as claimed in claim 1 after the two components have been mixed and cured.

10. A coating comprising the cured composition as claimed in claim 9 coated on a floor or roof area.

11. The composition as claimed in claim 6, wherein the second component further comprises fractions of diphenylmethane 2,4'- or 2,2'-diisocyanate or derivatives of diphenylmethane 4,4'-diisocyanate or homologs of diphenylmethane 4,4'-diisocyanate.

* * * * *